UNITED STATES PATENT OFFICE.

CHARLES E. HAMILTON, OF WINNIPEG, MANITOBA, CANADA, ASSIGNOR TO JOSHUA OLDHAM AND SONS, OF BROOKLYN, NEW YORK, A CORPORATION.

BRAZING COMPOUND.

No. 848,592.

Specification of Letters Patent.

Patented March 26, 1907.

Application filed October 3, 1906. Serial No. 337,235.

*To all whom it may concern:*

Be it known that I, CHARLES E. HAMILTON, a subject of the King of Great Britain, residing at Winnipeg, in the Province of Manitoba and Dominion of Canada, have invented a new and useful Brazing Compound, of which the following is a specification.

My invention relates to an improved brazing compound especially designed for use in the manufacture of band-saws.

Its object is to provide for readily and effectively uniting, as by brazing, with the use of hard metal, the ends of an object, as a band-saw, whereby may be obtained a neat or presentable and homogeneous weld, which it is obvious is a desideratum for the above-expressed purpose.

It consists of the employment and amalgamation of certain ingredients, as hereinafter disclosed, and pointed out by the claims.

In the disclosure of my invention I employ the following ingredients or materials: (A) chemically-pure machine oil or grease, two ounces, (2 oz.;) (B) ferrous carbonate, four ounces, (4 oz.;) (C) borax, (borate,) twelve ounces, (12 oz.;) (D) sodium carbonate, one ounce, (1 oz.;) (E) sal-ammoniac, half-ounce, (½ oz.,) optional; (F) potassium carbonate, one ounce, (1 oz.)

For preparation these materials or ingredients, exclusive of the oil at this time, are placed and mixed together in a suitable receptacle, as a "mortar," adding thereto two ounces (2 oz.) of water. When thoroughly incorporated or compounded, the resulting mixture is removed from the mortar and suitably spread for drying. After having been thoroughly dried said mixture is returned to the mortar, the oil in the quantity above noted then being added and thoroughly mixed or combined therewith. The mixture or compound is now suitable for effecting the brazing operation, with the use of silver or other soldering material, as solder, spelter, &c. I am not able to explain the chemical reactions that take place between these ingredients; but the flux has the property of uniting the metals without destroying the temper of the steel.

I claim—

1. A brazing compound of the character described, comprising oil, ferrous carbonate, borax, sodium carbonate, and potassium carbonate, compounded in the proportions and manner described.

2. A brazing compound of the character described, consisting of oil, two ounces; ferrous carbonate, four ounces; borax, twelve ounces; sodium carbonate, one ounce, and potassium carbonate, one ounce, all compounded as set forth.

3. A brazing compound of the character described, consisting of oil, two ounces; ferrous carbonate, four ounces; borax, twelve ounces; sodium carbonate, one ounce; sal-ammoniac, half-ounce, and potassium carbonate, one ounce, all compounded as set forth.

In testimony whereof I affix my signature in presence of two subscribing witnesses.

CHARLES E. HAMILTON.

Witnesses:
 JAMES M. TAPLEY,
 GERALD S. ROXBURGH.